United States Patent
Silvester

(10) Patent No.: US 7,023,968 B1
(45) Date of Patent: Apr. 4, 2006

(54) MESSAGE HANDLING SYSTEM

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/189,250

(22) Filed: Nov. 10, 1998

(51) Int. Cl.
H04M 1/64 (2006.01)

(52) U.S. Cl. ............................... 379/88.13; 379/88.07; 379/88.11; 379/88.12; 379/88.13; 379/88.19; 379/88.2; 379/88.21

(58) Field of Classification Search ................. 379/34, 379/48, 49, 67.1, 69, 70, 79, 87, 82, 83, 88.07, 379/88.19, 88.21, 88.26, 88.27, 93.03, 93.05, 379/142, 171, 177, 179, 185, 214, 376, 88.2, 379/88.11, 88.12
See application file for complete search history.

(56) References Cited

U.S. PATENT DOCUMENTS

| | | | | |
|---|---|---|---|---|
| 5,327,486 A | * | 7/1994 | Wolff et al. | 379/96 |
| 5,457,738 A | * | 10/1995 | Sylvan | 379/96 |
| 5,568,540 A | * | 10/1996 | Greco et al. | 379/67.1 |
| 5,608,786 A | * | 3/1997 | Gordon | 379/100 |
| 5,625,676 A | * | 4/1997 | Greco et al. | 379/88 |
| 5,651,054 A | * | 7/1997 | Dunn et al. | 379/67.1 |
| 5,699,089 A | * | 12/1997 | Murray | 345/146 |
| 5,742,668 A | * | 4/1998 | Pepe et al. | 379/58 |
| 5,742,905 A | * | 4/1998 | Pepe et al. | 455/461 |
| 5,822,405 A | * | 10/1998 | Astarabadi | 379/88.04 |
| 5,848,130 A | * | 12/1998 | Rochkind | 379/88.01 |
| 5,894,504 A | * | 4/1999 | Alfred et al. | 379/88.13 |
| 6,018,571 A | * | 1/2000 | Langlois et al. | 379/207 |
| 6,052,442 A | * | 4/2000 | Cooper et al. | 379/88.19 |
| 6,161,007 A | * | 12/2000 | McCutcheon et al. | 455/412 |
| 6,219,407 B1 | * | 4/2001 | Kanevsky et al. | 379/88.02 |
| 6,570,964 B1 | * | 5/2003 | Murveit et al. | 379/67.1 |
| 2003/0128820 A1 | * | 7/2003 | Hirschberg et al. | |

* cited by examiner

Primary Examiner—Allan Hoosain
(74) Attorney, Agent, or Firm—Trop, Pruner & Hu, P.C.

(57) ABSTRACT

A system for handling messages may be adapted to handle both electronic mail and telephonic messages in substantially the same fashion. For example, telephonic messages may be converted to a textual format including both the identity of the source of the call and the substance of the call. The telephonic message may then be displayed using a graphical user interface that indicates whether the message is from a telephone source or an electronic mail source and provides information about the substance of the message in either case. Moreover, the system may handle calls differently based on the originator of the call.

18 Claims, 4 Drawing Sheets

MESSAGE HANDLING SYSTEM

This invention relates generally to handling messages using electronic devices such as computer systems and in particular embodiments, handling telephonic and/or electronic mail messages.

Messages may be forwarded to a recipient through a variety of sources. Telephonic messages are conventionally handled by answering machines or voice mail systems. These systems generally record the incoming voice message using either analog or digital formats. These systems allow audio playback of the incoming message.

Computer systems may also be utilized as telephone answering devices. Software exists which logs incoming telephone calls and displays a list of those calls using graphical user interfaces.

Similarly, electronic mail messages may be received using computer systems or other electronic devices. These mail messages may be displayed in a log using well known graphical user interfaces.

However, there is a need for more efficient handling of messages in a variety of formats.

SUMMARY

In accordance with one embodiment, a method of receiving messages includes receiving electronic mail messages and receiving telephonic messages. The electronic mail and telephonic messages are displayed together on a graphical user interface.

In accordance with another embodiment, a method of handling telephonic messages includes identifying the source of a telephonic message. At least a portion of the telephonic message is converted to text. The text is displayed in connection with a graphical user interface.

In still another embodiment, a computer-implemented method for handling messages includes identifying the source of the message. The message is then handled differently depending on the source of the message.

DETAILED DESCRIPTION

Figure 1:
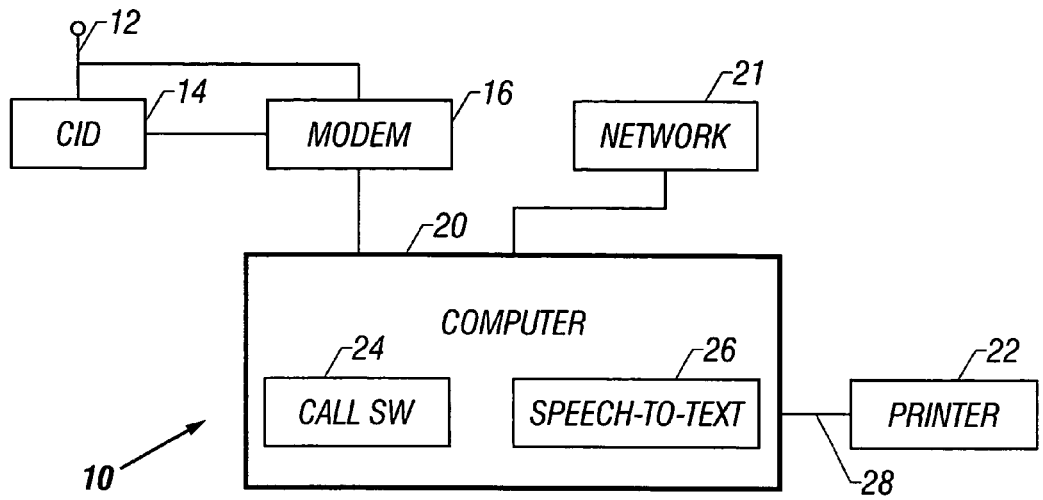
FIG. 1 is a block diagram showing hardware in accordance with one embodiment of the invention.

Telephonic and electronic mail messages may be received over a telephone line 12, shown in FIG. 1. The source of telephonic messages may be decoded using a caller identity delivery (CID) decoder 14. The decoder 14 provides information about the telephone number of the caller who originated the telephone communication.

Electronic mail messages generally include a packet with fields that identify the caller, for example, in connection with conventional transmission control protocol/Internet protocol (TCP/IP) and other known techniques. The incoming communication is then received by a modem 16 which converts the information from a format suitable for communication over telephone lines to a digital format suitable for use in connection with electronic devices 20, such as a computer system as shown in the embodiment illustrated in FIG. 1.

The modem 16 and CID 14 may or may not be part of the computer 20 or other appliance with computer-like capabilities. The computer 20 may also be coupled to a network 21 to receive electronic communications in one embodiment of the invention.

The computer system 20 may include call handling software 24 and speech-to-text conversion software 26. The system 20 may also communicate with a printer 22 by a link 28. The link 28 may be a wire or wireless link including a radio frequency link or an infrared link such as that associated with the Infrared Data Association (IrDA) specification (www.irda.com), as examples.

Figure 2:
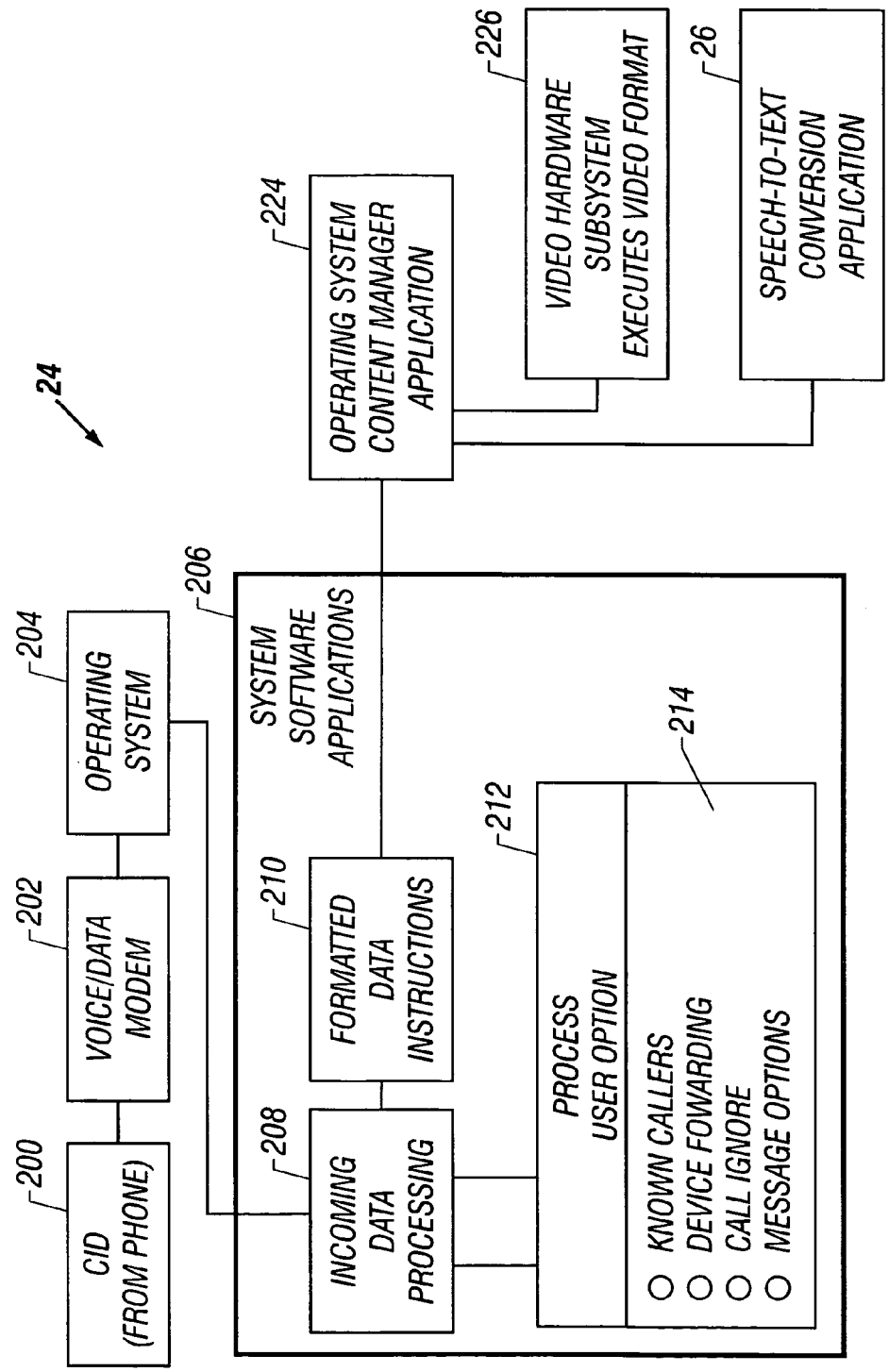
FIG. 2 is a block depiction showing a data flow in accordance with one embodiment of the invention.

The data flow related to the software 24, as illustrated in an embodiment shown in FIG. 2, begins with the receipt of the CID information from the telephone system, as indicated at block 200. This information may be processed by a voice/data modem 202 which provides information about the source of the caller to an operating system 204 associated with the computer 20. Incoming data processing may be accomplished at block 208.

At block 212, the software 24 may process user-selected options, for example during an initial setup sequence, which may include a plurality of message handling options. For example, the user can input a database of known callers. Using this database, the system 10 may handle incoming calls from certain callers in a different way than it handles calls from other callers. Alternatively, the database may be an existing database such as a corporate phone list, corporate e-mail list or other defined database. Similarly, the user can input information about device forwarding. For example, incoming calls may be forwarded to other electronic devices such as cellular telephones or pagers, if desired. Likewise, the user can program whether to completely ignore calls from certain telephone numbers or sources. Finally, in the illustrated embodiment, the user can also select a plurality of message options so that different message options can be displayed based on the source of the incoming communication.

The user options along with received incoming data may be formatted into data instructions as indicated in block 210 and forwarded to an operating system content manager application 224. The content manager then may communicate appropriate display options to the video hardware subsystem 226 to execute the appropriate video format options. Alternatively, speech-to-text conversion application software 26 may be utilized to convert the voice messages into text for display using conventional office software such as Microsoft Office® or Microsoft Outlook®.

Figure 3:
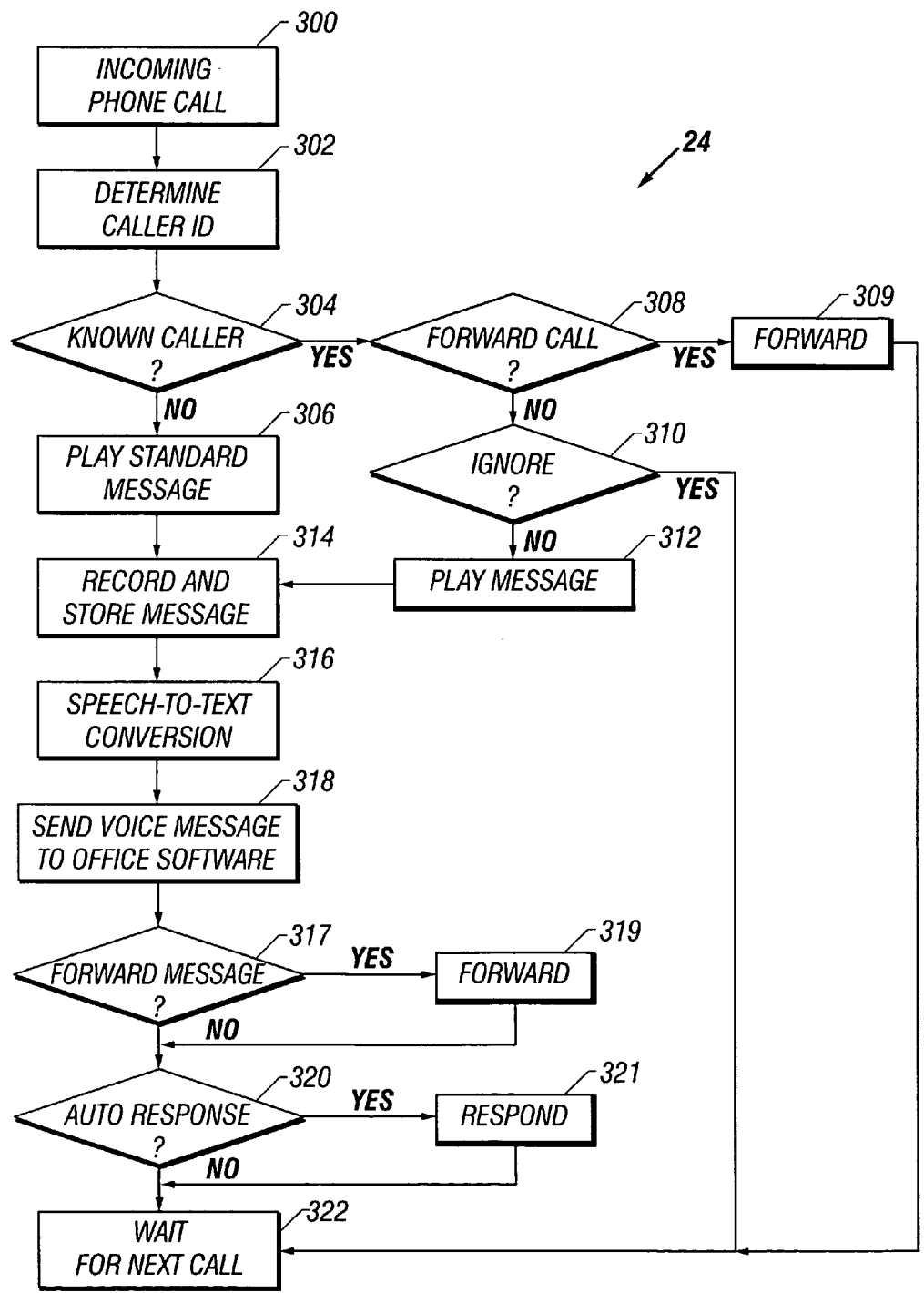
FIG. 3 is a flow chart illustrating one embodiment of the invention.

Turning now to FIG. 3, the software 24 receives incoming telephone call information as indicated at block 300. The identity of the caller is determined as indicated at diamond 302.

At diamond 304, a determination is made as to whether the caller is a known caller. Using a database compiled in the user option setup process, as indicated at block 212 in FIG. 2, the identity of the caller is compared to a list of known callers. If the caller is not on the known caller list, a standard message may be played back as indicated in block 306. Otherwise, a determination is made at diamond 308 whether the call should be forwarded to another telephone device. For example, if the caller is considered to be an important caller, based on information in the database, the call may be forwarded to an appropriate telephony device as indicated at 309. This may involve as an example, forwarding a message to a pager or a cellular phone in an automated fashion. It may also involve sending a fax message using a fax modem. In still another alternative, an electronic mail message may be forwarded to a predetermined electronic mail address based on information contained in the known caller database.

If the database does not indicate that forwarding is appropriate, a decision is made at diamond 310 whether the call should simply be ignored and deleted. For example, it may be known that a given caller repeatedly calls, but it is not desired to return the call. This information may be provided in the database and the incoming call is simply discarded. Otherwise, an appropriate message is played back (block 312). The appropriate message may be determined through the message options in the user options setup process, as indicated in block 212 in FIG. 2. Thus, different messages can be provided based on the identity of the source caller.

If the message is accepted, the message is recorded and stored as indicated at block 314. The message is then converted from speech-to-text for application display as indicated at block 316. Thus, a least a portion of the message, together with the identity of the caller, may be converted into a text format for display on a graphic user interface. The graphical user interface may provide sufficient information so that the user can determine the nature of the call quickly and can decide how to respond.

Text information related to a voice message may be transferred to an application that is able to list identified incoming calls, such as an office software suite of the type exemplified by Microsoft Office® as indicated on block 318 and may be incorporated into an appropriate graphical user interface associated with such software.

For example, the information may be provided to the office software in a predetermined format, for example having pre-defined fields recognized by the office software.

At diamond 317, the software determines whether the message should be forwarded in some fashion. Message forwarding may be done in a variety of ways including an e-mail message to another user, a pager message with the key words and phone number from the recorded message, or even parsing the message for order information or call back information in an automated ordering system. If forwarding is appropriate as determined, for example from a database, the message is forwarded in accordance with the predetermined protocol as indicated at block 319.

Next, a check determines (at diamond 320) whether to provide an automated response to the message. All messages, or certain predetermined messages from particular callers may trigger automated responses. Also, callers that select a particular option may be responded to with an automated response. If an automated response is determined to be appropriate, the response may be issued, as indicated in block 321.

Thereafter, the flow waits for the next available call as indicated at block 322. The next call is handled in the same fashion.

Figure 4:
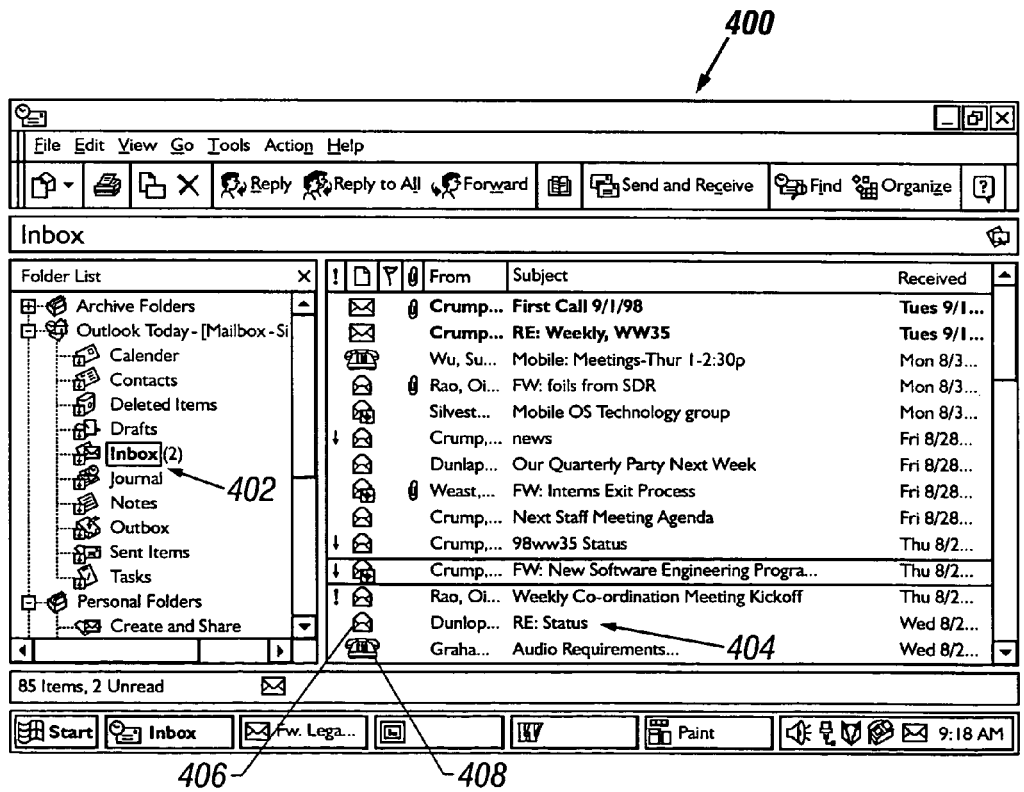
FIG. 4 is a graphical user interface in accordance with one embodiment of the present invention.

Referring now to FIG. 4, a graphical user interface 400 may be utilized to log and display information about incoming communications. In the illustrated format, which corresponds to common office suite software, an inbox 402 graphical user interface is displayed in the region 404 on a display device such as a monitor.

A list of communications may be provided in one embodiment of the invention in the region 404 including e-mail messages associated with the envelope icon 406 and telephonic messages associated with the telephone icon 408. Thus, the user can quickly see which messages were received by electronic mail and which ones were received telephonically. Through the voice-to-text conversion process, a textual display may be developed of an initial portion of the telephonic message together with the identity of the caller, if known.

Alternatively, an audio recording of a voice message may be attached as a file to the converted text message. In this case the recipient can refer to either the textual or audio formats.

The user may then click on the different messages to display a user option menu. The menu may provide selections for an automated response such as by telephone call, e-mail, or fax if the identity of the caller or sender is known. Using database information the responsive communication may be implemented automatically.

In some embodiments, it may be advantageous to display both electronic mail messages and telephonic messages in substantially the same way. This may provide an integrated message handling system which allows the user to deal with messages which were received in different ways using the same techniques. This integration may also simplify message handling and facilitate efficient disposition of messages. For example, it is not necessary for the user to use different software and different graphical user interfaces to handle different messages. Moreover, the user can receive a display of all the messages and can use known techniques to handle messages in the same way regardless of how the messages were received.

The system may handle telephone messages and electronic mail messages for a single computer system. It may also be used in connection with larger systems which receive a large number of calls, for example, for order processing. The text of the calls may be printed out using the printer 22 for subsequent handling. The information may be collected in an automated fashion to facilitate efficient disposition.

For example, a message may be provided to callers which asks the caller to respond to predefined questions. Thus, the recipient can get the information which the recipient needs to process the requests from the caller in an automated fashion. For example, the caller may be asked to say his or her name and the response is recorded. The caller can be asked for his or her phone number and the response is recorded. Then the caller may be asked pointed questions about the nature or purpose of the call. This information can then be easily formatted into an outgoing message, for example in text format, which may routed appropriately for message handling. In the order taking situation, the order may be immediately processed based on the answers to the questions posed.

Figure 5:
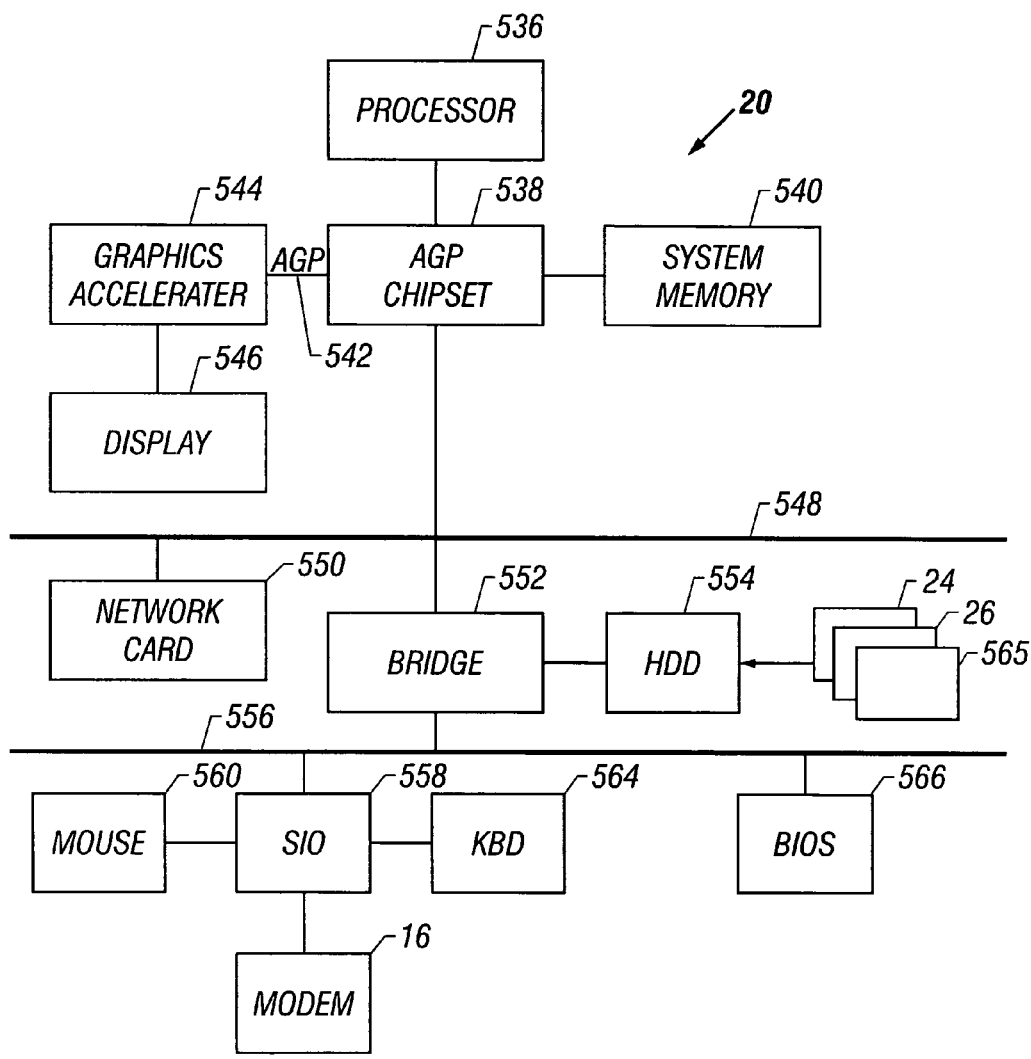
FIG. 5 is a block diagram showing one embodiment for implementing the computer shown in FIG. 1.

Referring now to FIG. 5, an example of one embodiment of the system 20 is illustrated. The system 20 may include a processor 536, which in some embodiments may be coupled to an accelerated graphics port (AGP) chipset 538. AGP is described in the Accelerated Graphics Port Interface Specification, Revision 1.0, Jul. 31, 1996 by Intel Corporation, Santa Clara, Calif. The chipset 538 in turn, may be coupled to system memory 540 and an AGP bus 542. The bus 542 may in turn, be coupled to a graphics accelerator 544, which may be coupled to a display 546.

The chipset 538 may also be coupled to a primary bus 548, which in turn, may be coupled to a network card 550. The network card may enable communications with other computers in a network.

The bus 548 may be coupled to a bridge 552, which in turn, may be coupled to a hard disk drive 554 or other storage medium. The hard disk drive 554 or other storage medium may include one or more software programs for implementing the functions described previously including the software 24, the speech-to-text conversion software 26, and office suite software 565.

The bridge 552 may be coupled to another bus 556 in an illustrated embodiment. The bus 556 may, in turn, be coupled to a basic input/output system (BIOS) 566 and a serial input/output (SIO) interface 558. The interface 558, in turn, may be coupled to a keyboard 564, a mouse 560 and the modem 516.

While the present invention has been described with respect to a limited number of embodiments, those skilled in the art will appreciate numerous modifications and variations therefrom. It is intended that the appended claims cover all such modifications and variation as fall with the true spirit and scope of the present invention.

What is claimed is:

1. A method comprising:
identifying information about the source of a voice message;
selecting a portion of said voice message;
converting said portion of said voice message to text;
exporting said portion and said source information into a graphical user interface that displays a log of telephone calls including the source information and information about the subject matter of the voice message; and
displaying said portion in said graphical user interface including displaying the source of said voice message and using said portion to indicate information about the subject matter of the voice message.

2. The method of claim 1 wherein identifying information about the source of a voice message includes using a caller identification device.

3. The method of claim 1 wherein selecting a portion of said message includes selecting the initial portion of said message of a size sufficient to fit within an available field within said graphical user interface.

4. The method of claim 1 wherein exporting said portion and said source information into a graphical user interface includes exporting said portion and said source information in a fashion that the portion may be provided under a heading indicating the source of the telephone call and said portion is displayed under a heading that indicates the subject matter of the telephone call.

5. The method of claim 3 including exporting said portion and said source information into a graphical user interface that also lists received e-mail messages.

6. The method of claim 5 including exporting said portion and said source information into a graphical user interface that indicates e-mail messages and provides information about the source of the e-mail messages and the subject matter of the e-mail messages.

7. A computer accessible medium storing instructions to:
identify information about the source of a voice message;
select a portion of said voice message;
convert said portion to text;
export said portion and said source information into a graphical user interface that displays a log of telephone calls including the source information and information about the subject matter of the voice message; and
display said portion in said graphical user interface including the source of said voice message and using said portion to indicate information about the subject matter of said voice message.

8. The computer accessible medium of claim 7 further storing instructions to select an initial portion of said message of a size sufficient to fit within an available field within said graphical user interface.

9. The computer accessible medium of claim 7 further storing instructions to export said portion and said source information so that the portion may be provided under a heading indicating the source of the telephone call and said portion is displayed under a heading that indicates the subject matter of the telephone call.

10. The computer accessible medium of claim 9 further storing instructions to export said portion and said source information into a graphical user interface that also lists received e-mail messages.

11. The computer accessible medium of claim 10 further storing instructions to export said portion and said source information into a graphical user interface that indicates e-mail messages and provides information about the source of the e-mail messages and the subject matter of the e-mail messages.

12. A system comprising:
a processor; and
a memory coupled to said processor storing instructions that enable the processor to identify information about the source of a voice message, select a portion of the voice message, convert said portion to text, export said portion and said source information into a graphical user interface that displays a log of telephone calls including the source information and the information about the subject matter of the voice message, and display said portion in a graphical user interface displaying the source of said voice message and using said portion to indicate information about the subject matter of said voice message.

13. The system of claim 12 including a caller identification device coupled to said processor.

14. A method comprising:
identifying information about a source of a voice message;
selecting a portion of said voice message to convert into text; and
exporting said portion and said source information into a graphical user interface to display, on a log of telephone calls, said source information and information obtained from said converted portion about the subject matter of said voice message.

15. The method of claim 14 including determining whether the caller is a known caller.

16. The method of claim 15 including based on said determining, playing either a standard message or a customized message to said caller.

17. The method of claim 14 including displaying an indication of an email message on said log.

18. The method of claim 14 including requesting, from said source, information about the subject matter of said voice message.

* * * * *